US008742698B2

(12) United States Patent
Pan et al.

(10) Patent No.: US 8,742,698 B2
(45) Date of Patent: Jun. 3, 2014

(54) LIGHT EMITTING DIODE (LED) LIGHT SOURCE CONTROL SYSTEM FOR INTELLIGENTIZED LAYER BREEDING

(75) Inventors: Xuedong Pan, Zhejiang (CN); Xuke Li, Zhejiang (CN); Hong Zhou, Zhejiang (CN)

(73) Assignee: Hangzhou Hanhui Optoelectronic Technology Co., Ltd. (CN)

( * ) Notice: Subject to any disclaimer, the term of this patent is extended or adjusted under 35 U.S.C. 154(b) by 0 days.

(21) Appl. No.: 13/823,538

(22) PCT Filed: Dec. 31, 2010

(86) PCT No.: PCT/CN2010/080625
§ 371 (c)(1),
(2), (4) Date: May 28, 2013

(87) PCT Pub. No.: WO2012/034341
PCT Pub. Date: Mar. 22, 2012

(65) Prior Publication Data
US 2013/0271022 A1    Oct. 17, 2013

(30) Foreign Application Priority Data

Sep. 16, 2010    (CN) .......................... 2010 1 0284173

(51) Int. Cl.
*H05B 37/02*    (2006.01)
(52) U.S. Cl.
USPC .......................................... 315/312; 315/308
(58) Field of Classification Search
USPC ............. 315/209 R, 291, 307, 308, 312, 210;
119/6.8, 174, 437, 531, 537
See application file for complete search history.

(56) References Cited

U.S. PATENT DOCUMENTS 7,230,535 B2 *   6/2007   Jackson et al. ............. 340/572.1

FOREIGN PATENT DOCUMENTS

| CN | 1871894 A | 12/2006 |
|---|---|---|
| CN | 201029360 Y | 3/2008 |
| JP | 10-208537 A | 8/1998 |
| JP | 2007-059260 A | 3/2007 |
| JP | 2007-165016 A | 6/2007 |
| WO | 2009093493 A1 | 7/2009 |

OTHER PUBLICATIONS

International Search Report; International Application No. PCT/CN2010/080625; International; Date of Mailing: Jun. 30, 2011; 6 pages with English Translation.

* cited by examiner

*Primary Examiner* — Jimmy Vu
(74) *Attorney, Agent, or Firm* — Cantor Colburn LLP

(57) ABSTRACT

A Light Emitting Diode (LED) light source control system for intelligentized layer breeding, comprises a plurality of LED lamps (30) equipped at a layer breeding place and a LED light source controller (10). Each of the LED lamps (30) comprises a red light LED and a green light LED. The LED light source controller (10) controls the LED lamps (30) to emit green light during the brooding period and the improved period of a layer; and the LED light source controller (10) controls the LED lamps (30) to emit red light during the egg producing period of a layer. The LED light source controller (10) controls the illumination intensity of the LED lamps (30) by regulating the duty ratio of an output Pulse-Width Modulation (PWM). The LED light source controller (10) controls the illumination time of the LED lamps (30) by utilizing a clock unit so as to implement different illumination time respectively during various stages of the brooding period, the improved period and the egg producing period of a layer. The system can improve the production performance of the layer effectively, realize the purpose of increasing production and emission reduction, and decrease the mortality of the layer.

10 Claims, 6 Drawing Sheets

LIGHT EMITTING DIODE (LED) LIGHT SOURCE CONTROL SYSTEM FOR INTELLIGENTIZED LAYER BREEDING

This application is the national phase of International Application No. PCT/CN2010/080625, titled "LIGHT EMITTING DIODE (LED) LIGHT SOURCE CONTROL SYSTEM FOR INTELLIGENTIZED LAYER BREEDING", filed on Dec. 31, 2010, which claims priority to Chinese patent application No. 201010284173.2 titled "LIGHT EMITTING DIODE (LED) LIGHT SOURCE CONTROL SYSTEM FOR INTELLIGENTIZED LAYER BREEDING" and filed with the State Intellectual Property Office of PRC on Sep. 16, 2010, both of which are incorporated herein by reference in its entirety.

FIELD OF THE INVENTION

The present invention relates to a light source control system for layer breeding, in particular, to an LED light source control system for intelligentized layer breeding.

BACKGROUND OF THE INVENTION

Illumination is one of necessary environmental conditions for layer breeding, and is closely related to the growth quality of chicklings, the quantity of survivals, the egg yield of adults, and the like. The illumination may facilitate the ingest, drink and exercise of chicklings, enhance the metabolism, improve the utilization rate of feedstuffs, promote the ovary development and the sexual maturity, and increase the egg production. Therefore, a breeder should establish a proper illumination system, enhance the illumination management, and artificially complement the illumination when necessary. Only in this way can the breeder improve the production of layers and obtain a better economic benefit.

The illumination duration has important effect on a layer, and a proper illumination duration is very important to the activity, material metabolism, growth and producing capacity of a layer. The illumination duration is further closely related to the sexual maturity of a layer. During the improved period of a layer, the sexual maturity will be postponed if the illumination duration is too short, otherwise the sexual maturity will be advanced. An early mature layer will start to lay eggs early but has a low egg yield and a short laying period. If the illumination duration is suddenly shortened during the fastigium of egg laying, the egg yield will be reduced and the mortality will be increased, and the egg yield can hardly be recovered to the original level during a short period even if the original illumination duration is resumed.

The illumination intensity also has important effect on a layer, and a negative consequence will be incurred if the illumination is too strong or too weak. An over strong illumination results in not only waste of electricity but also fidget of layers, rendering the layers to be neurotic, prone to be frightened and hyperactive, leading to huge consumption of energy, frequent tussle and pecking mania. If the illumination is intensified suddenly, the quality of eggshells will be decreased, and abnormal eggs, such as eggs with broken eggshell, soft eggshell, double-yolk or alecithal eggs, will be increased, and the rate of sudden death will be raised. The illumination of low intensity is advantageous for fat deposit during the fattening period, so a lay will gain weight faster when it is fed under a dark condition. However, if the illumination is too weak, chicklings will ingest less and drink less, so that the growth of chicklings will be influenced; and weak illumination has little stimulating effect on layers, affecting the egg yield.

At present, household chicken farms have a lot of problems in using illumination. Mostly, incandescent lamps or fluorescent lamps are employed as the light source, resulting in a high cost and a poor performance. A common incandescent bulb has a similar spectrum as the natural light, where most of the heat energy is dissipated as infrared rays rather than light rays, and there are more red and orange portions but less blue and green portions in the spectrum; A fluorescent tube, including the warm light type and the cold light (blue and green spectrum) type, can not endure a frequent start-up and regulation of the illumination intensity. Although a mercury vapour lamp has a similar efficiency, it is not applicable to a general low henhouse, and it needs a preheat time to be completely bright.

Furthermore, for the simple purpose of lighting for feeding at night, only one or two lamps are randomly installed in the henhouse. The requirement for illumination can not be met by the rare quantity and low power of the lamps, and the illumination intensity is not evenly distributed due to the improper distance between the lamps and the inappropriate mounting height of the lamps. At the place close to a lamp, the light is too strong so that the layers are neurotic and fidgety, causing tussling, pecking mania and rectocele. While at the place far from a lamp, the light is too weak to meet a requirement of illumination intensity, effecting the ingesting and drinking of the layers. Mostly, a chicken breeder turns a lamp on or off suddenly, causing a sudden change between a strong brightness and a darkness, which is an extreme stimulation for the herd, often resulting in a pecking anus, a rectocele, a fidget and a neurotic sudden death of the layers, also resulting in a notable increase of soft-shell eggs, broken-shell eggs and abnormal eggs and a great reduction in the economic benefit of the layer breeding.

An illumination complement system for intelligentized regulation to the illumination is an urgent need for the illumination in a henhouse because the requirement of the illumination quality, intensity and period during the lift cycle of a layer is complicated and demanding.

SUMMARY OF THE INVENTION

In view of the disadvantages of high energy consumption, inhomogeneous light color, short life and the like existing in the layer breeding employing a traditional artificial light source, the present invention provides an LED light source control system for intelligentized layer breeding, which can improve the production performance of layers effectively, raise economic benefit, realize the purpose of increasing production and emission reduction; and according to the present invention, not only the mortality may be decreased but also the growth rate may be improved to a higher level.

For this purpose, the present invention employs the following technique solution: an LED light source control system for intelligentized layer breeding, including an LED light source controller, a general power supply for LEDs and multiple LED lamps connected to a driving circuit of the LED light source controller through a power line, where the general power supply for LEDs supplies power to the LED lamps through the LED light source controller, and the general power supply for LEDs includes a socket providing utility power and a voltage conversion device converting the utility power to a DC power; the multiple LED lamps may be arranged in various manners such as a line, a surface, a bulb and the like, each of the LED lamp consists of a red light LED and a green light LED, and the driving of the red light LED and the green light LED is controlled respectively by two control output interfaces of the LED light source controller.

The LED light source controller includes a microprocessor, a clock unit and a serial communication interface unit both connected to the microprocessor. The microprocessor is provided with an internal storage EEPROM to store a parameter for regulating a growth curve of layers. The serial communication interface unit further performs data transmission and receiving with a computer installed with a setting software module for setting the parameter for regulating the growth curve of layers, and the microprocessor is embedded with a control software module for regulating the illumination intensity of the LED lamps. The clock unit is configured to set the illumination duration and period of the LED lamps.

In a regulation of the light, a clock signal and a parameter in a main control chip of the microprocessor are set according to different requirements for the illumination quality at different growth stages of the layers: for the $0^{th}$-$2^{nd}$ growth days in the brooding period of the layers, maintaining a whole day illumination of green light with an intensity of 15-30 lux for 24 hours each day by regulating the duty ratio of a Pulse-Width Modulation (PWM) output, setting an invariable parameter in the EEPROM so that a constantly invariable output signal drives a MOS transistor, and setting, via the clock, a continuous clock pulse signal with a driving period of 48 hours for ensuring the driving time; for the $3^{rd}$-$7^{th}$ growth days in the brooding period of the layers, maintaining a green light with an intensity of 10-25 lux in the period of 0:00~21:59, maintaining dark in the period of 22:00~23:59, and setting the driving time of the clock to a corresponding interval; for the $8^{th}$-$14^{th}$ growth days in the brooding period of the layers, maintaining a green light with an intensity of 5-20 lux in the period of 0:00~21:59, maintaining dark in the period of 20:00~23:59, and setting the driving time of the clock to a corresponding interval; for the $15^{th}$-$21^{st}$ growth days in the brooding period of the layers, maintaining a green light with an intensity of 5-20 lux in the period of 0:00~17:59, maintaining dark in the period of 18:00~23:59, and setting the driving time of the clock to a corresponding interval; for the $22^{nd}$-$28^{th}$ growth days in the brooding period of the layers, maintaining a green light with an intensity of 5-20 lux in the period of 0:00~15:59, maintaining dark in the period of 16:00~23:59, and setting the driving time of the clock to a corresponding interval; for the $29^{th}$-$120^{th}$ growth days in the brooding period of the layers, maintaining a green light with an intensity of 5-20 lux in the period of 0:00~11:59, maintaining dark in the period of 12:00~23:59, and setting the driving time of the clock to a corresponding interval; for the $121^{st}$-$140^{th}$ growth days in the improved period of the layers, maintaining a green light with an intensity of 5-20 lux in the period of 0:00~07:59, maintaining dark in the period of 08:00~23:59, and setting the driving time of the clock unit to a corresponding interval; in the egg producing period of the layers, maintaining a red light with an intensity of 5-25 lux in the period of 0:00~15:59, and maintaining dark in the period of 16:00~23:59.

According to the present invention, for different requirements of the illumination quality at different growth stages of the layers, a parameter for regulating a growth curve of layers is set by a setting software module in the computer, and is stored in the internal storage EEPROM of the microprocessor (MCU). In the present invention, the computer may be removed each time when the parameter is stored (the parameter is the same for the same growth stage, so it is not necessary to set the parameter again). The control software module in the microprocessor reads the parameter stored in the internal storage EEPROM and run to control the lamps to be on or off so as to regulate the illumination intensity of the LED lamps.

As a further improvement and complement for the above-mentioned technical solution, the present invention employs the following technique measures:

A chip with model number of MEGA8L under the AVR series is adopted as the main control chip of the microprocessor (MCU), and the main control chip regulates the duty ratio through a PWM output so as to regulate the illumination intensity of lamps.

A voltage stabilizing capacitor is connected between a high potential pin and an adjacent ground pin of the main control chip.

The clock unit is connected with a backup DC power supply; and the circuit of the clock unit includes a chip with model number of PCF8563, in which a two-terminal ceramic filter is connected in serial between the pin OSC1 and pin OSC0.

The voltage conversion device is to convert an AC power supply of 220V into a low voltage DC power supply of 12V and 1 A.

The output of the general power supply for LEDs is controlled by the LED light source controller, and a specific parameter of power supply (time, period, or amplitude of the power supply) is changed according to a growth parameter (period and condition of the growth) of the layers. The distance between adjacent LED lamps may be regulated properly according to the actual situation.

Programmable LED lamps are employed in the present invention to automatically regulate the illumination quality, intensity and duration, meeting the requirements for the illumination duration and intensity by the layers at different stages. A parameter for regulating a growth curve of the layers is set according to the different requirements for illumination quality at different growth stages of the layers and is stored in the internal storage of the MCU, in which the parameter of the illumination intensity is scaled down as the growth period of the layers and the illumination intensity is ensured by the setting of the Pulse-Width Modulation (PWM).

The present invention has the following beneficial effects: as compared with the traditional artificial light source, in the present invention, better performance is achieved in the aspects of the energy-saving effect, the illumination efficiency, the utilization of light, and the adjustability of the illumination quality and period; according to the present invention, the production performance of the layers may be improved, the economic benefit may be increased, and the purpose of increasing production and reducing emission may be achieved.

In the following, the present invention will be further described with accompanying drawings and detailed description.

DETAILED DESCRIPTION OF THE INVENTION

According to the present invention, by means of the illumination on the layers by the green light lamps (green lamps) and the red light lamps (red lamps), the biological requirement of the layers may be met and the production performance by be highly utilized. Especially for the several days old chicklings that just enter a henhouse and are severely stressed, an illumination of green light has such an obvious sedation effect that the chicklings will be calmed down and ingest actively within only 3~6 hours. Preferably, an illumination intensity of 10~20 lux is adopted for meat chicklings. A bright light may help the chicklings to find water and food. However, after 10~14 days, the illumination intensity need to be decreased gradually to a level of 5 lux which may quiet the chicklings more and reduce the activity of the chicklings to gain more weight. In the egg producing period, an illumination of red light is adopted to increase the quantity of egg production. Furthermore, the growth and the egg production of the layers may be improved by properly controlling the illumination duration of LED lamps. In Table 1, preferable parameters of the color of the LED light, the illumination intensity and duration at the growth periods of the layers are listed.

TABLE 1

| Breeding period | Breeding date (days) | LED color | LED illumination intensity (lux) | LED illumination duration |
|---|---|---|---|---|
| the brooding period | 1-2 | green | 15-30 | 24 hours bright |
| the brooding period | 3-7 | green | 10-25 | 0:00~21:59 bright; 22:00~23:59 dark |
| the brooding period | 8-14 | green | 5-20 | 0:00~19:59 bright; 20:00~23:59 dark |
| the brooding period | 15-21 | green | 5-20 | 0:00~17:59 bright; 18:00~23:59 dark |
| the brooding period | 22-28 | green | 5-20 | 0:00~15:59 bright; 16:00~23:59 dark |
| the brooding period | 29-120 | green | 5-20 | 0:00~11:59 bright; 12:00~23:59 dark |
| the improved period | 121-140 | green | 5-20 | 0:00~07:59 bright; 08:00~23:59 dark |
| the egg producing period | 141-400 | red | 5-25 | 0:00~15:59 bright; 16:00~23:59 dark |

Figure 1:
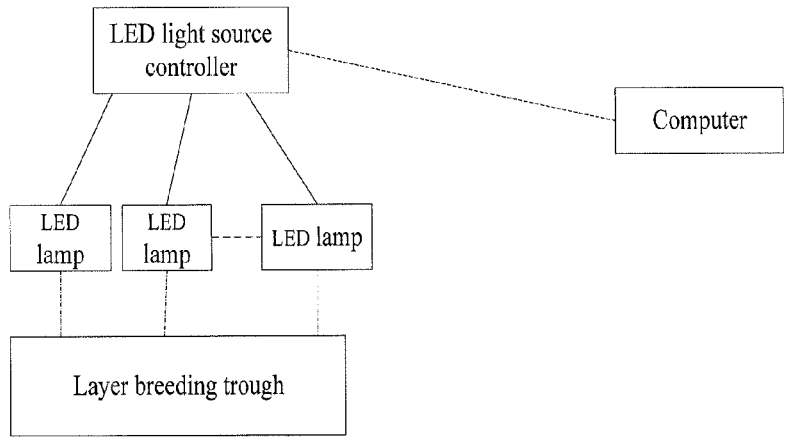
FIG. 1 is a schematic diagram of the principle according to the present invention.
Figure 2:
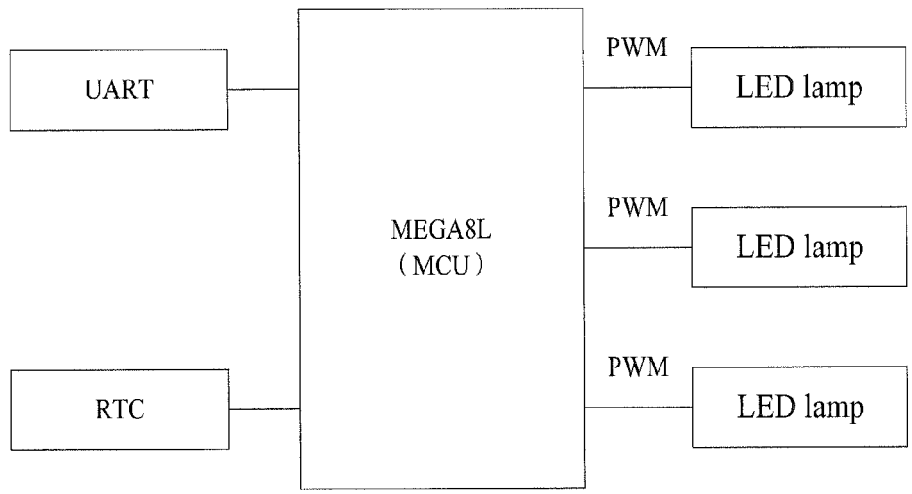
FIG. 2 is a schematic diagram of a microprocessor according to the present invention.

As shown in FIG. 1 and FIG. 2, an LED light source control system for intelligentized layer breeding consists of three parts: an LED light source controller, a general power supply for LEDs and multiple LED lamps. The LED light source controller includes a microprocessor (MCU), a clock unit (RTC) and a serial communication interface unit (UART) both connected to the microprocessor, in which the microprocessor is connected through a serial cable to a computer installed with a setting software module for setting a parameter for regulating a growth curve of layers, and the LED lamps are connected to a driving circuit of the LED light source controller through a power cable.

The microprocessor is provided with an internal storage EEPROM to store the parameter for regulating the growth curve of layers and is embedded with a control software module. The microprocessor is configured to control the functioning of the control software module and the data communication with the computer. An intelligent control to the LED lamps is realized through the microprocessor and the control software module. The LED general power supply supplies a voltage and a current for the LED (OLED) lamps. The LED light source controller functions according to different requirements for the illumination intensity at different growth stages of the layers, the computer sets corresponding parameter through the setting software module and stores the parameter into the EEPROM in the MCU, and the control software module controls the functioning of the LED lamps according to the parameter in the EEPROM.

A chip with the module number of MEGA8L under the AVR series (i.e. a Single-Chip Microcomputer) is adopted as a main control chip of the microprocessor (MCU), drives the LED lamps by driving MOS transistors respectively through 18 I/O interface cables, runs the control software module, and regulates the duty ratio through a PWM output, so as to realize the regulation of the illumination intensity of the LED lamps.

In a regulation of the light, a clock signal and a parameter in a main control chip of the microprocessor are set according to different requirements for the illumination quality at different growth stages of the layers: for the $0^{th}$-$2^{nd}$ growth days in the brooding period of the layers, maintaining a whole day illumination of green light with an intensity of 20 lux for 24 hours each day by regulating the duty ratio through the Pulse-Width Modulation (PWM) output, setting an invariable parameter in the internal storage EEPROM of the main control chip MGEA8L so that a constantly invariable output signal drives the MOS transistors, and setting, via the clock, a continuous clock pulse signal with a driving period of 48 hours for ensuring the driving time.

For the $3^{rd}$-$7^{th}$ growth days in the brooding period of the layers, a green light with an intensity of 15 lux is maintained in the period of 0:00~21:59, dark is maintained in the period of 22:00~23:59, and the driving time of the clock is set to a corresponding interval; for the $8^{th}$-$14^{th}$ growth days in the brooding period of the layers, a green light with an intensity of 10 lux is maintained in the period in the period of 0:00~21:59, dark is maintained in the period of 20:00~23:59, and the driving time of the clock is set to a corresponding interval; for the $15^{th}$-$21^{st}$ growth days in the brooding period of the layers, a green light with an intensity of 5 lux is maintained in the period of 0:00~17:59, dark is maintained in the period of 18:00~23:59, and the driving time of the clock is set to a corresponding interval; for the $22^{nd}$-$28^{th}$ growth days in the brooding period of the layers, a green light with an intensity of 5 lux is maintained in the period of 0:00~15:59, dark is maintained in the period of 16:00~23:59, and the driving time of the clock is set to a corresponding interval; for the $29^{th}$-$120^{th}$ growth days in the brooding period of the layers, a green light with an intensity of 5 lux is maintained in the period of 0:00~11:59, dark is maintained in the period of 12:00~23:59, and the driving time of the clock is set to a corresponding interval; for the $121^{st}$-$140^{th}$ growth days in the improved period of the layers, a green light with an intensity of 5 lux is maintained in the period of 0:00~07:59, dark is maintained in the period of 08:00~23:59, and the driving time of the clock is set to a corresponding interval; in the egg producing period of the layers, a red light with an intensity of 10 lux is maintained in the period of 0:00~15:59, and dark is maintained in the period of 16:00~23:59. The specific PWM regulation is obvious for those skilled in the art.

Figure 3:
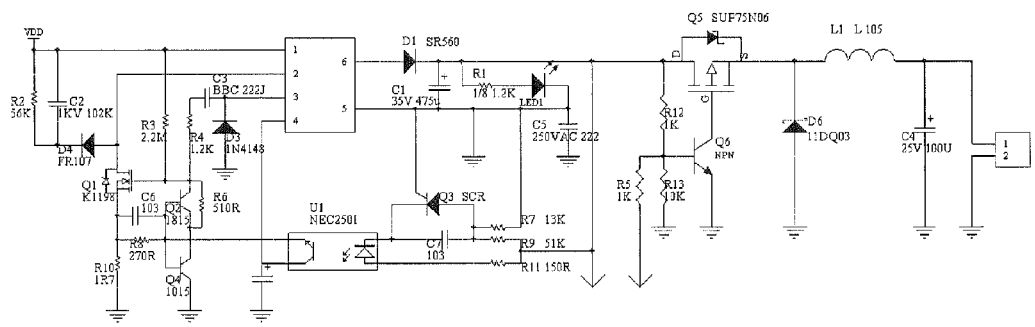
FIG. 3 is a circuit diagram showing that an LED light source controller controls a general power supply for LEDs in the present invention.

FIG. 3 is a circuit diagram showing that an LED light source controller controls a general power supply for LEDs according to the present invention. The circuit is mainly to convert the utility power supply into a 12V DC power supply with constant current and constant voltage, provides the 12V DC power supply to an LED (OLED) lamp board, and mainly includes MOSFETs, diodes and the like. A desired voltage is output by a Pulse-Width Modulation (PWM) control. At the beginning, once a start-up power supply is connected, a start-up current is provided to a switch tube Q1 via a resistor R4, so that a switch Q3 is turned on and the circuit starts to work. A 12V AC voltage is output from a subsequent stage, after being filtered and rectified by a Schottky diode SR560 and an electrolytic capacitor C1 connected to the Schottky diode SR560, a 12V DC power supply with constant current and constant voltage is output.

When an I/O control interface of the microprocessor (MCU) controls to turn on a transistor Q2, the switch tube Q1 is on at the same time, so a diode D4 is off, and a rectified input voltage charges C through Q1 and L, the current of which adds the energy storage in the inductance L. When the I/O control interface of the microprocessor (MCU) controls to turn off the transistor Q2, the switch tube Q1 is also turned off, and the inductance L produces an induced voltage, the stored energy in the inductance L is released through the LED lamps acting as a load and a freewheeling diode Q1 so as to maintain the 12V DC voltage for the LED lamps. The LED light source controller communicates with the computer to implement the input of a control signal through the computer and the setting software module. The LED light source controller of the present invention may accomplish the transmission of related data, the setting of the duration and period, and the like, thereby implementing a light control according to a growth curve of the layers as shown in Table 1.

Figure 4:
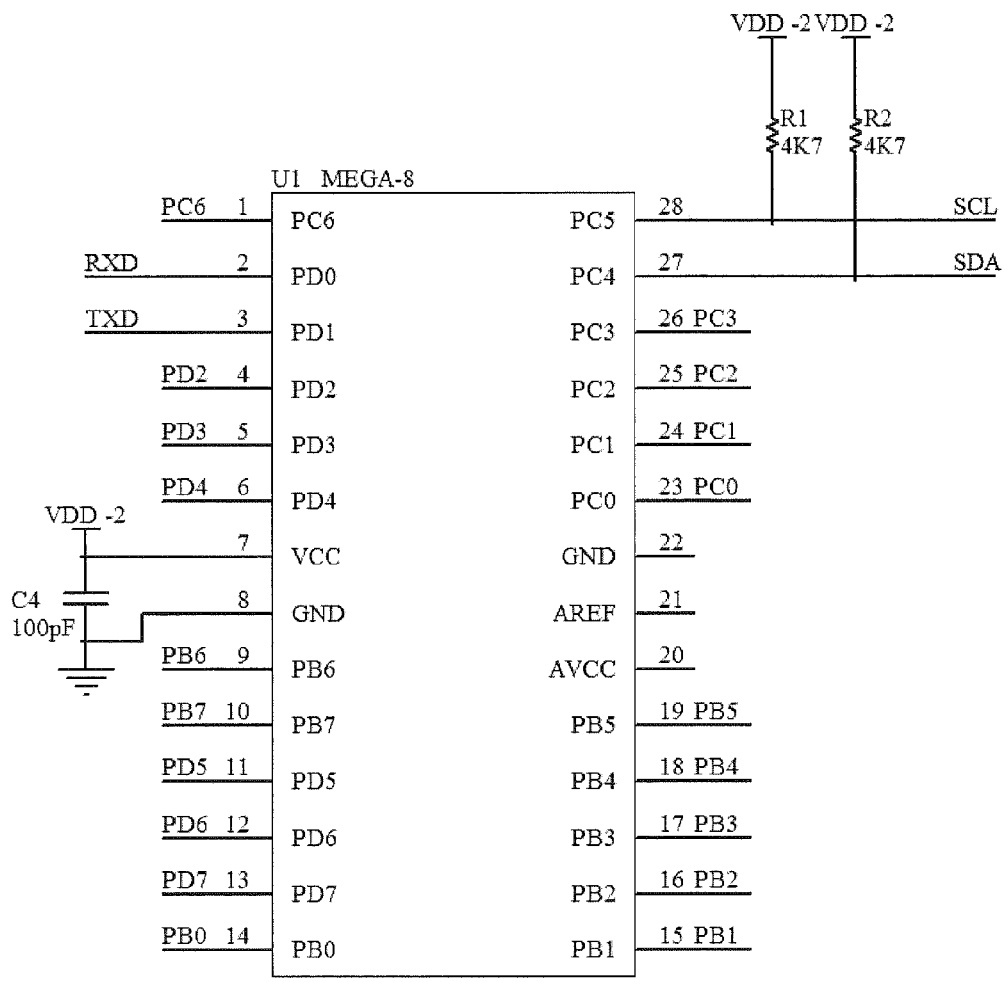
FIG. 4 is a circuit diagram of a main control chip of MCU according to the present invention.

FIG. 4 is a circuit diagram of a main control chip of a microprocessor according to the present invention. To ensure the safe functioning of the circuit of the whole control system, there is a capacitor C4 connected between a high potential pin 7 and a ground pin of the chip of the microprocessor, in which pin 28 and pin 27 are connected respectively to a control line (SCL) and a Source Data Acquisition line (SDA) of a Clock chip to transfer data with a Clock circuit, and in the connection from the pin 28 and 27 to a power supply VDD-2, dropping resistors R1 and R2 having equal resistances are connected respectively.

Figure 5:
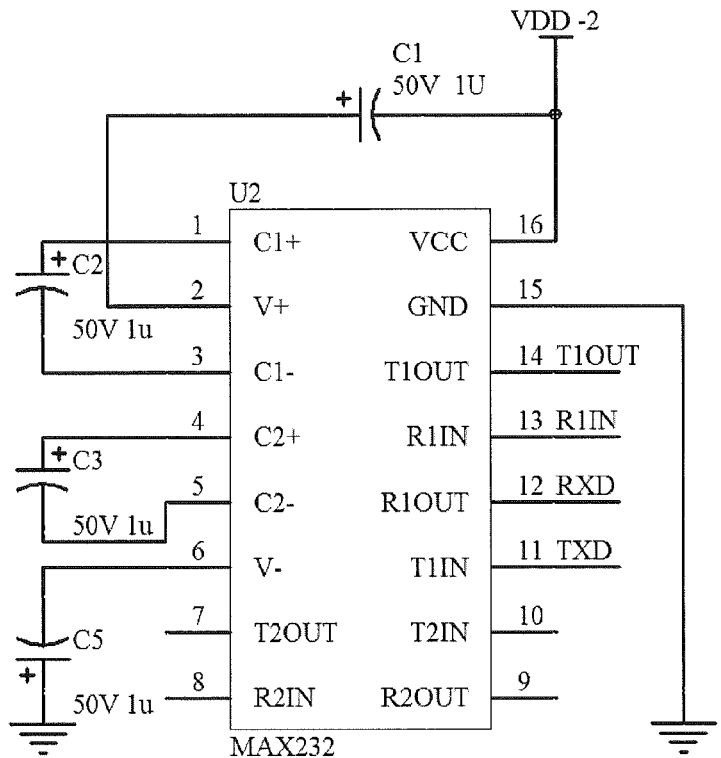
FIG. 5 is a circuit diagram of a serial communication interface unit (UART) according to the present invention.

FIG. 5 is a circuit diagram of a serial communication interface unit (UART) according to the present invention. The serial communication interface unit communicates with the computer through a chip with model number of MAX232 and a standard serial interface, in which the TXD pin and the RXD pin in the chip MAX232 are connected respectively to the TXD pin and the RXD pin of the chip MEGA8L; while the T1OUT pin in the chip MAX232 is connected to pin 2 of the interface DB9; the pin R1IN is connected to pin 3 of the interface DB9; and pin 5 of the DB9 is grounded.

Figure 6:
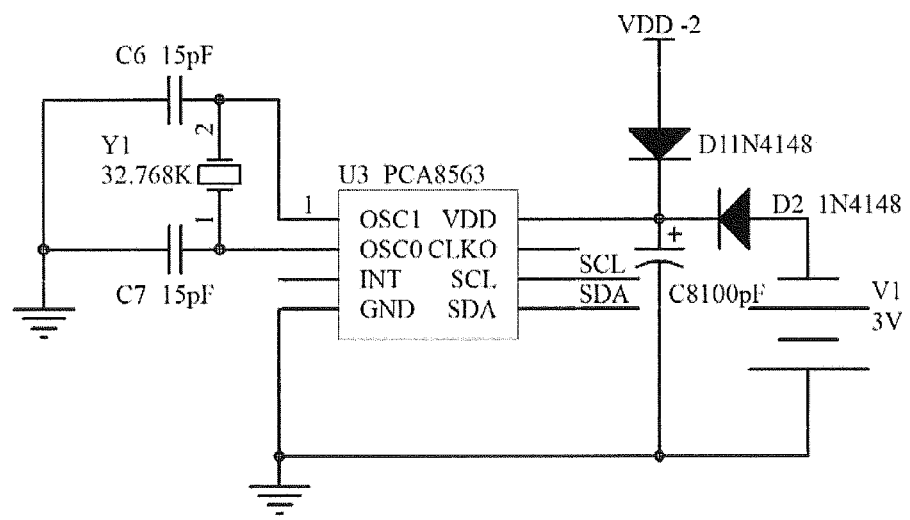
FIG. 6 is a circuit diagram of a clock unit (RTC) according to the present invention.

As shown in FIG. 6, the setting of the clock unit (RTC) and the illumination period is accomplished by an RTC chip with the model number of PCF8563 and related elements. There is a two-terminal ceramic filter connected in serial between pin OSC1 and pin OSC0 of the chip PCF8563. The circuit is provided with a 3V backup DC power supply V1, which may ensure that a problem of losing time will not happen at an outage. The Clock chip with model number of PCF8563 is connected to a power supply VDD-2 through a diode D1 and connected to a backup DC power supply V1 through a diode D2, in which the diodes D1 and D2 form a unidirectional current path so as to prevent an interference between the power supply VDD-2 and the backup DC power supply V1.

The Clock circuit of the present invention may set a clock signal and supply the clock signal to the LED light source controller conveniently.

The multiple LED lamps may be arranged in various manners such as a line, a surface, a bulb and the like. Each LED lamp consists of a red light LED and a green light LED, and the driving of the red and green light LED is controlled respectively by two control output interfaces of the LED light source controller. In the interval between adjacent lamps there is proper illumination density, so as to meet requirement to the illumination intensity for the growth of the layers in the present invention.

Figure 7:
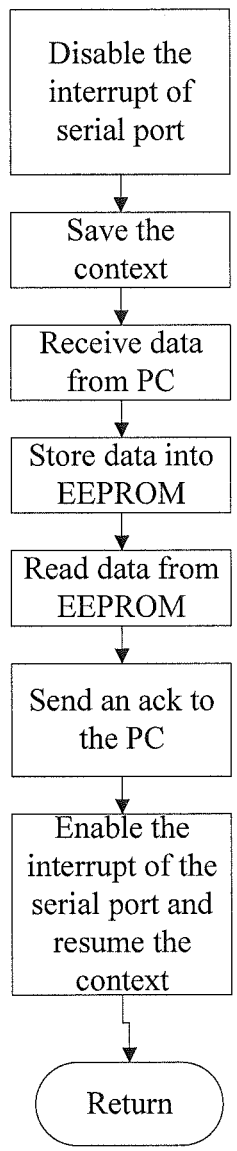
FIG. 7 is a schematic flowchart of a setting software module according to the present invention.
Figure 8:
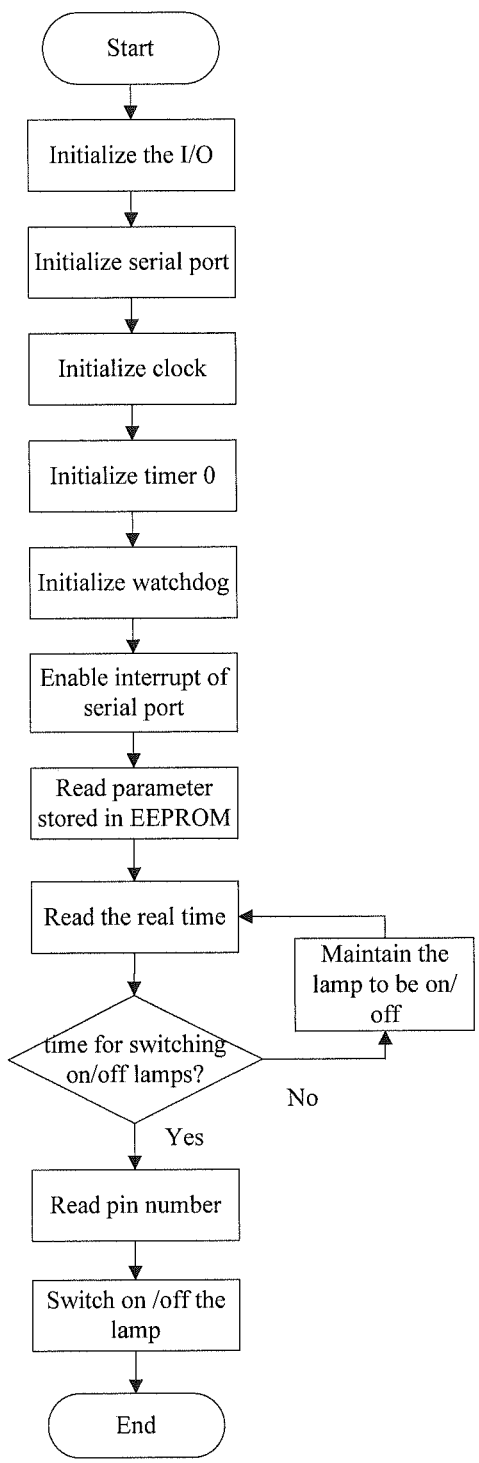
FIG. 8 is a schematic flowchart of a control software module according to the present invention.

FIG. 7 and FIG. 8 respectively show flowcharts performed by a setting software module and a control software module.

The LED in the present invention may also be an Organic Light-Emitting Diode (OLED).

According to the present invention, the LED light source control system for intelligentized layer breeding is simple in structure and is practical in application, meets the growth requirement of the layers and reduces the cost of layer breeding. Modifications to the control according to the growth requirement of the layers may be made by those skilled in the art, and any modification without any creative labor falls in the protection scope of the present invention.

The invention claimed is:

1. A light emitting diode (LED) light source control system for intelligentized layer breeding, comprising an LED light source controller, a general power supply for LEDs, and a plurality of LED luminaries connected to a driving circuit of the LED light source controller through a power line, wherein the general power supply for LEDs supplies power to the LED luminaries through the LED light source controller, and the general power supply for LEDs comprises a socket providing utility power and a voltage conversion device converting the utility power to DC power; each of the LED luminaries comprises a plurality of LED lamps arranged in a line, each of the LED lamps comprises a red light LED and a green light LED, and driving of the red light LED and the green light LED is controlled respectively by control output interfaces of the LED light source controller; and the LED light source controller comprises a microprocessor, a clock unit and a serial communication interface unit both connected to the microprocessor; the microprocessor is provided with an internal storage EEPROM to store a parameter for regulating a growth curve of layers; the serial communication interface unit performs data transmission and receiving with a computer installed with a setting software module for setting the parameter for regulating the growth curve of the layers, and the microprocessor is embedded with a control software module for regulating an illumination intensity of the LED lamps; the clock unit is configured to set an illumination duration and an illumination period of the LED lamps;

in regulation of lights of the LED luminaries, a clock signal and a parameter in a main control chip of the microprocessor are set according to different requirements for a light quality at different growth stages of a layer, wherein: in first two growth days in a brooding period of the layer, a whole day illumination of green light with an intensity of 15-30 lux for 24 hours each day is maintained by regulating a duty ratio of a PWM output, an invariable parameter is set in the internal storage EEPROM so that a constantly invariable output signal drives a MOS transistor, and a continuous clock pulse signal with a driving period of 48 hours is set via the clock to ensure the driving time; in the third to the seventh growth days in the brooding period, a green light with an intensity of 10-25 lux is maintained at a height of layer eyes in the period of 0:00~21:59 and a dark is maintained in the period of 22:00~23:59, and the driving time of the clock is set to a corresponding interval; in the eighth to the fourteenth growth days in the brooding period, a green light with an intensity of 5-20 lux is maintained in the period of 0:00~19:59 and the dark is maintained in the period of 20:00~23:59, and the driving time of the clock is set to the corresponding interval; in the fifteenth to the twenty first growth days in the brooding period, a green light with an intensity of 5-20 lux is maintained in the period of 0:00~17:59 and the dark is maintained in the period of 18:00~23:59, and the driving time of the clock is set to the corresponding interval; in the twenty second to the twenty eighth growth days in the brooding period, a green light with an intensity of 5-20 lux is maintained in the period of 0:00~15:59 and the dark is maintained in the period of 16:00~23:59, and the driving time of the clock is set to the corresponding interval; in the twenty ninth to the one hundred and twentieth growth days in the brooding period, a green light with an intensity of 5-20 lux is maintained in the period of 0:00~11:59 and the dark is maintained in the period of 12:00~23:59, and the driving time of the clock is set to the corresponding interval; in the one hundred and twenty first to the one hundred and fortieth growth days in an improved period, a green light with an intensity of 5-20 lux is maintained in the period of 0:00~07:59 and the dark is maintained in the period of 08:00~23:59, and the driving time of the clock is set to the corresponding interval; in an egg producing period, a red light with an intensity of 5-25 lux is maintained in the period of 0:00~15:59 and the dark is maintained in the period of 16:00~23:59.

2. The LED light source control system for intelligentized layer breeding according to claim 1, wherein a main control chip of the microprocessor is a chip with a model number of MEGA8L under AVR series, and the main control chip drives a MOS transistor through an I/O interface to drive the LED lamps, and regulates the duty ratio through the PWM output, so as to realize a regulation to the illumination intensity of the LED lamps.

3. The LED light source control system for intelligentized layer breeding according to claim 1, wherein a voltage stabilizing capacitor is connected between a high potential pin and a ground pin of the main control chip.

4. The LED light source control system for intelligentized layer breeding according to claim 2, wherein a voltage stabilizing capacitor is connected between a high potential pin and a ground pin of the main control chip.

5. The LED light source control system for intelligentized layer breeding according to claim 1, wherein the clock unit is connected with a backup direct current power supply.

6. The LED light source control system for intelligentized layer breeding according to claim 2, wherein the clock unit is connected with a backup direct current power supply.

7. The LED light source control system for intelligentized layer breeding according to claim 1, wherein the clock unit comprises a chip with a model number of PCF8563, and a two-terminal ceramic filter is connected in serial between a pin OSC1 and a pin OSC0 of the chip with the model number of PCF8563.

8. The LED light source control system for intelligentized layer breeding according to claim 2, wherein the clock unit comprises a chip with a model number of PCF8563, and a two-terminal ceramic filter is connected in serial between a pin OSC1 and a pin OSC0 of the chip with the model number of PCF8563.

9. The LED light source control system for intelligentized layer breeding according to claim 1, wherein the LED lamps are replaced with OLED lamps.

10. The LED light source control system for intelligentized layer breeding according to claim 2, wherein the LED lamps are replaced with OLED lamps.

\* \* \* \* \*